2,890,217

WATER-INSOLUBLE AZO DYESTUFFS

Werner Schleifenbaum, Leverkusen-Bayerwerk, Germany, assignor to Farbenfabriken Bayer Aktiengesellschaft, Leverkusen, Germany, a corporation of Germany No Drawing. Application September 11, 1957
Serial No. 683,208

Claims priority, application Germany September 20, 1956

1 Claim. (Cl. 260—203)

The present invention relates to new water-insoluble azo dyestuffs and to a process for their manufacture; more particularly it relates to monoazo dyestuffs corresponding to the formula

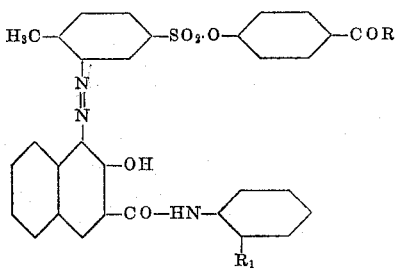

wherein R and $R_1$ stand for a $CH_3$— or $OCH_3$-group.

In accordance with the present invention it has been found that valuable water-insoluble azo dyestuffs are obtainable by coupling in substance or on a substrate diazotized amines of the general formula

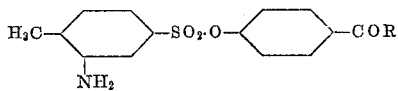

wherein R means a $CH_3$— or —$OCH_3$-group, with 1-(2′,3′-hydroxynaphthoylamino)-2-methyl- or 2-methoxybenzene. The new bases to be applied are obtainable by reacting 1-methyl-2-nitrobenzene-4-sulfochloride with alkali metals salts of the methylester of 4-hydroxy-benzoic acid or of 4-hydroxyacetophenone to form the corresponding sulfonic acid esters and by reducing in known manner the nitro compounds thus obtained.

The starting components are preferably coupled in a medium which is acid to Congo; it is advantageous to add small amounts of a surface-active substance to the finely divided suspension of the coupling component. The dyestuff formation may be accelerated by the addition of salts of organic acids, particularly sodium acetate.

The dyestuffs thus obtainable are in the dry state yellowish red pigments which are practically insoluble in alcohol, oil, benzene and in the usual solvents for lacquers and possess a very good fastness to light. They are therefore particularly suitable for the use in graphic printing and in wall paper printing and for the dyeing of oil, nitro and synthetic resin lacquers. The new dyestuffs may also be employed for pigment printing and for the dyeing of spinning solutions.

The following examples are given for the purpose of illustrating the invention.

Example 1

300 grams of 1-(2′,3′-hydroxynaphthoylamino)-2-methoxybenzene are dissolved in 2.5 litres of water and 420 millilitres of a 15 percent sodium hydroxide solution by heating to 70–80° C. The solution is filtered. An aqueous solution of 14 grams of a sodium alkyl ($C_{16}$–$C_{18}$) sulfonate is added thereto, the mixture is cooled to 0–3° C. by the addition of ice, and the naphthol is precipitated by rapidly running 220 millilitres of 30 percent hydrochloric acid into the solution. The liquor thus obtained shows an acid reaction to Congo.

321 grams of 1-amino-2-methyl-benzene-5-sulfonic acid-(4′-carbomethoxy)-phenyl ester are stirred with a mixture of 1400 millilitres of water and 480 millilitres of 30 percent hydrochloric acid. The temperature of the suspension should be 5–10° C. A solution of 73 grams of sodium nitrite in 250 millilitres of water is rapidly run into it with stirring. After about 1 hour the diazotizing is completed. The solution is filtered after the addition of some activated carbon and the excess nitrite is removed by the addition of an aqueous solution of aminosulfonic acid.

The diazo solution thus obtained is stirred with the suspension of the coupling component and the mixture is slowly heated to about 40° C. The coupling is completed after 3–4 hours. The dyestuff is filtered off with suction, washed acid free and dried. It is a bright yellowish red powder of good fastness to solvents.

Example 2

305 grams of 1-amino-2-methyl-benzene-5-sulfonic acid-(4′-acetophenone)-ester are dissolved by slightly heating in 1000 millilitres of glacial acetic acid and 420 millilitres of 30 percent hydrochloric acid. The mixture is cooled to 15° C. by addition of ice and diazotized with a solution of 73 grams of sodium nitrite in 250 millilitres of water.

The diazo solution clarified by filtration is added to the arylamide suspension obtained according to Example 1; 1000 millilitres of a 30 percent sodium acetate solution are rapidly run into the mixture, while heating to 40° C. at the same time. The coupling is completed after 1 hour. After filtering off with suction and drying, a dyestuff pigment is obtained which exhibits a similar shade and similar fastness properties to the dyestuff obtained according to Example 1.

Example 3

298.5 grams of 1-(2′,3′-hydroxynaphthoylamino)-2-methylbenzene are dissolved in 4 litres of water and 165 millilitres of a 50 percent sodium hydroxide solution by heating to about 80° C. After the addition of a little activated carbon, the solution is filtered and cooled with stirring to room temperature. An aqueous solution of 14 grams of a sodium alkyl sulfonate or of the same quantity of oleylmethyltauride is added to this solution which is then cooled to about 1° C. by the addition of crushed ice. The naphthalene derivative is re-precipitated by pouring 280 millilitres of glacial acetic acid into the mixture with vigorous stirring. After stirring for 1 hour the suspension thus obtained is treated with a diazo solution which may be prepared as follows:

321 grams of 1-amino-2-methyl-benzene-5-sulfonic acid-4′-carbomethoxy)-phenyl ester are introduced in small portions at 20–25° C. with stirring into a mixture of 1000 millilitres of glacial acetic acid, 250 millilitres of water and 420 millilitres of 30 percent hydrochloric acid. Stirring is then continued for 30 minutes, the mixture is cooled to about 5° C. by addition of crushed ice, and diazotized by pouring rapidly 240 millilitres of a 30 percent nitrite solution into it, whereby the temperature should not exceed 15° C. and a constant excess of nitrite should be present. The diazo solution is filtered after the addition of some activated carbon. The excess nitrite is removed from the clarified solution by addition of an aqueous solution of aminosulfonic acid.

The coupling mixture is slowly heated to 40° C. The coupling is completed after about 1 hour. The dyestuff is filtered off, washed salt-free and dried. A bright red pigment is thus obtained which in the oil full shade and in the zinc white blend is somewhat more bluish than the pigment obtained according to Example 1. It possesses good fastness to solvents and to light.

*Example 4*

100 grams of a paste which was obtained by kneading 25 grams of the pigment dyestuff according to Example 2 with 25 grams of benzyl-p-hydroxy-diphenyl-polyglycol-ether and 50 millilitres of water, are poured into a mixture of 20 grams of a latex prepared from 30% of butadiene and 70% of methacrylic acid methyl ester, and of 2 grams of triacryl-formal. After the addition of 2 grams of glycol or glycerin, 30 grams of a 2% aqueous methylcellulose thickening are added with stirring. The paste thus obtained is printed on cotton or regenerated cellulose. After steaming and heating it yields prints which are fast to rubbing and washing and which distinguish themselves by a good fastness to light.

I claim:

Water-insoluble azo dyestuffs corresponding to the formula

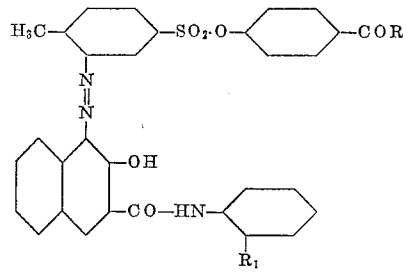

wherein R and $R_1$ stand for radicals selected from the group consisting of a —$CH_3$— and —$OCH_3$-group.

References Cited in the file of this patent
UNITED STATES PATENTS

| | | |
|---|---|---|
| 2,066,985 | Lamberz et al. | Jan. 5, 1937 |
| 2,660,576 | Schleifenbaum | Nov. 24, 1953 |